United States Patent
Theimer et al.

(10) Patent No.: US 6,557,111 B1
(45) Date of Patent: Apr. 29, 2003

(54) MULTICAST-ENHANCED UPDATE PROPAGATION IN A WEAKLY-CONSISTANT, REPLICATED DATA STORAGE SYSTEM

(75) Inventors: Marvin Theimer, Bellevue, WA (US); Mark Spiteri, Cambridge (GB); Daniel Swinehart, Palo Alto, CA (US); James P. Dourish, San Francisco, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/450,173

(22) Filed: Nov. 29, 1999

(51) Int. Cl.$^7$ ............................................. G06F 11/00
(52) U.S. Cl. ............................ 714/4; 707/8; 707/201; 707/203
(58) Field of Search .................... 714/4, 5, 6; 707/8, 707/201, 203

(56) References Cited

U.S. PATENT DOCUMENTS

| | | |
|---|---|---|
| 4,558,413 A | 12/1985 | Schmidt et al. |
| 5,241,675 A | 8/1993 | Sheth et al. |
| 5,255,387 A | 10/1993 | Arnold et al. |
| 5,280,612 A | 1/1994 | Lorie et al. |
| 5,287,496 A | 2/1994 | Chen et al. |
| 5,434,994 A | 7/1995 | Shaheen et al. |
| 5,551,027 A | 8/1996 | Choy et al. |
| 5,577,240 A | 11/1996 | Demers et al. |
| 5,581,754 A | 12/1996 | Terry et al. |
| 5,588,147 A | 12/1996 | Neeman et al. |
| 5,603,026 A | 2/1997 | Demers et al. |
| 5,671,407 A | 9/1997 | Demers et al. |
| 5,748,958 A * | 5/1998 | Badovinatz et al. ........ 709/100 |
| 6,182,117 B1 * | 1/2001 | Christie et al. ............. 709/205 |
| 6,263,433 B1 * | 7/2001 | Robinson et al. ........... 709/223 |
| 6,370,142 B1 * | 4/2002 | Pitcher et al. .............. 370/390 |
| 6,411,967 B1 * | 6/2002 | Van Renesse ............... 707/201 |

OTHER PUBLICATIONS

Robbert van Renesse, A Gossip–Style Failure Detection Service, 1996 by Chapman & Hall.*
"Epidemic Algorithms for Replicated Database Maintenance" (Jan. 1989, Demers et al., Xerox Corp.).
"Network Working Group, Request For Commments (RFC) 1112" (Aug. 1989, Deering, Stanford University).
"Network Working Group, Request For Commments (RFC) 1075" (Nov. 1988, Waitzman et al., Stanford University).
"Network Working Group, Request For Commments (RFC) 2236" (Nov. 1987, Fenner, Xerox Corp.).
"Organizing Multicast Receivers Deterministically by Packet–Loss Correlation" (1998, Levine et al., ACM Multimedia 98, Bristol UK).
"The Doctor Is In: Helping End–Users Understand the Health of Distributed System" (Dourish et al., 1999 draft, Xerox Corp.).

* cited by examiner

Primary Examiner—Robert Beausoliel
Assistant Examiner—Marc Duncan
(74) Attorney, Agent, or Firm—Fay, Sharpe, Fagan, Minnich & McKee, LLP (57) ABSTRACT

Epidemic-style update communications facilities are used in conjunction with multicast update communications facilities in weakly-consistent, replicated data storage systems. Epidemic-style communications handle a wide variety of failures at multiple levels of the system using a single, very robust, but also relatively high-latency mechanism. Multicast communication offers much quicker propagation but less fault tolerance using a different mechanism. The epidemic-style communications and multicast communications, combined for use in weakly consistent replicated database systems obtain a design that offers the benefits of both individual approaches.

20 Claims, 4 Drawing Sheets

MULTICAST-ENHANCED UPDATE PROPAGATION IN A WEAKLY-CONSISTANT, REPLICATED DATA STORAGE SYSTEM

FIELD OF THE INVENTION

The present invention is directed to applications and/or systems which require weakly-consistent, replicated data storage in order to enable continued operation of component subsets in the face of faults and network partitioning events. More particularly, the invention is directed to propagating updates from an originating replica to all other replicas in an efficient manner.

BACKGROUND OF THE INVENTION

In the field of distributed computing, questions of how best to allow multiple users access to a distributed database naturally arise. The answers change depending upon the design goals of the system and the expectations of its users.

In some systems that are designed to accommodate the shared access to data among a number of users, some form of data "replication" is typically implemented. To achieve data replication, systems are commonly partitioned into a number of data "servers"—each server having a complete replica of the system database. These servers process requests from a number of "clients." Typically, client requests come in the form of Reads and Writes to the system database. Replication of data allows flexibility and availability to clients. If data is completely (and perfectly) replicated across all servers, then a client will always have access to the same system data.

However, the cost of "perfect" replication may be prohibitive—especially in systems that have large numbers of clients and servers. Any change (due to a Write) effected by a client necessarily needs to be immediately propagated to all system servers to ensure perfect replication. If the updates are not "immediately" propagated throughout the system, there exists the possibility that some client will access a data item at a server that has not as yet been updated—thus violating the perfection of the replication.

As a practical matter, perfection, as a system goal, is impossible. Different schemes for the relaxation of this condition have emerged. At one end of the spectrum, a "strongly consistent" distributed database provides that changes are either atomically updated throughout the system or provide for some type of a server-initiated callbacks when inconsistencies occur. Although strongly consistent systems provide a high degree of data consistency, the price often paid is availability. For example, a client of a strongly consistent database requesting data that has recently been updated may have access blocked to that data until it has been updated across all servers.

At the other end, "weakly consistent" databases allow access to servers and data that may not contain all system updates. Such systems typically are characterized by the "lazy" propagation of updates between servers (i.e. updated servers propagate updates to other servers over time); thus the possibility exists for clients to see inconsistent values when reading data from different replicas. The use of weakly consistent replicated data has been driven by the needs existing in distributed environments. Another force driving use of weakly consistent systems has to do with improving performance, so that connecting to a nearby server for a read or write will be faster and smoother than connecting to another server. Clients in contact with a server, can gain useful information even when both client and server are partitioned from the other replicas. Weakly consistent replication systems attempt to ensure that these reads are usually reasonably up-to-date, and that eventually a full-state of synchronization will be reached. Thus, a primary motivation for using weakly consistent systems is to provide distributed replication for reliable, although only weakly consistent, access to shared information even in the face of faults and network partitioning or wide-spread network overload, so that long-term synchronization is achieved among replicas.

Unfortunately, the lack of guarantees concerning the ordering of read and write operations in weakly consistent systems can confuse users and applications. A user may read some value for a data item and then later read an older value. Similarly, a user may update some data item based on reading some other data, while others read the updated item without seeing the data on which it is based. A serious problem with weakly consistent systems is that inconsistencies can appear even when only a single user or application is making data modifications. For example, a mobile client of a distributed database system could issue a write at one server, and later issue a read at a different server. The client would see inconsistent results unless the two servers had synchronized with one another sometime between the two operations.

Despite the above noted disadvantages, weakly consistent systems are popular in situations that do not require total consistency in order to be valuable, due to their high-availability, good scalability, and simplicity of design. These advantages arise from the ability to allow reads and writes to be performed with little or no real-time synchronization among replicas.

To implement weakly consistent designs, systems and algorithms which offer a quick propagation of changes have been developed. However, these quick propagation designs such as multicasting, provide low levels of tolerances and have a "best efforts" standard of reliability.

Other designs are pre-configured to periodically send updates by means of pair-wise interactions to neighboring replicas that had not yet received updates which may have taken place. Such an approach insures that eventually all updates will reach all replicas, assuming that all replicas engage in sufficient pair-wise update exchanges so that a transitive closer on propagation is achieved. However, it may take a considerable amount of time for any given update to reach all the replicas whose local clients might be interested in its value.

Thus, a mechanism is needed for weakly-consistent databases, which are to be replicated that allows for obtaining a design that provides the best of a fast replication system which has a "best efforts" standard of reliability, with a highly reliable replication system, that has a high latency factor.

SUMMARY OF THE INVENTION

A multi-node computer network is provided having a weakly consistent replicated data storage system with an enhanced update mechanism which enables continued operation of network subsets in the face of faults and network partitioning events. Provided is a multicast communication update facility configured to propagate updates from an originating replica source in the computer network to all replicas of the computer network at a single time using a best-efforts design. An epidemic update communication facility is provided to send updates by pair-wise interaction to non-updated neighboring replicas, wherein the epidemic update communication facility and the multicast communication update facility are employed together in at least some of the replicas.

With attention to another aspect of the present invention, the multicast update communication facility and the epidemic update communication facility are configured in accordance with parameters which allow for the facilities to operate in a parallel non-overlapping manner with respect to each other.

With attention to yet another aspect of the present invention, the multicast update communication facility and the epidemic update communication facility are configured in accordance with parameters which cause the multicast update communication facility to influence a rate at which the epidemic update communication facility operates.

BRIEF DESCRIPTION OF THE DRAWINGS

Additional features and advantages of this invention will become apparent when the following detailed description is read in conjunction with the attached drawings, in which.

DETAILED DESCRIPTION OF THE PREFERRED EMBODIMENTS

Figure 1:
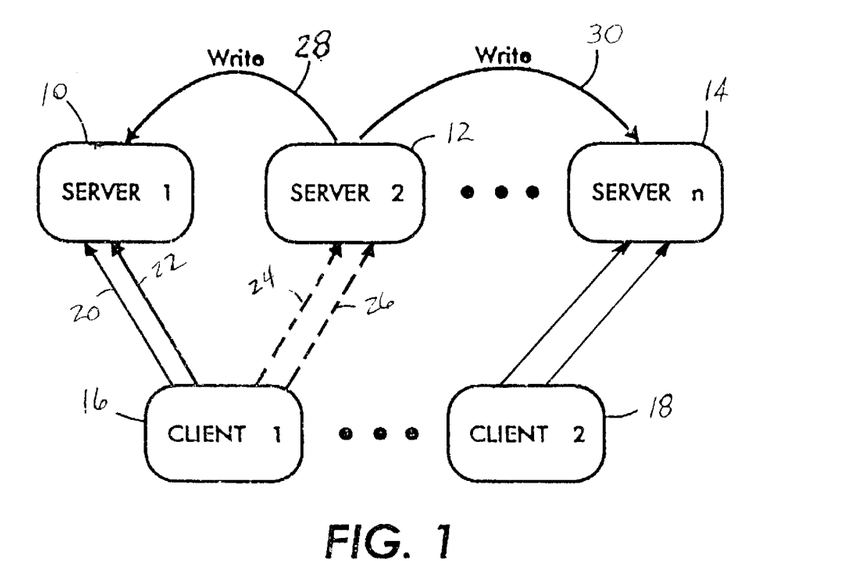
FIG. 1 is a diagram of the basic client/server model in which the present invention is implemented.

Some computational tools have insufficient storage for holding copies of all, or perhaps any, of the data that their users want to access. For this reason, this invention conveniently is implemented by systems that are architected, as shown in FIG. 1, to divide functionality between servers, as at 10, 12, 14, which store data, and clients, as at 16 and 18, which read and write data that is managed by servers. A server may have a number of functions and purposes. For the following discussion the ability of a server to hold a complete copy of one or more databases is particularly relevant. The term "database" is used loosely herein to denote a collection of individually identifiable data items which may be written and read, regardless of whether such data is managed as a relational database, is simply stored in a conventional file system, or conforms to any other data model. Clients are able to access data residing on any server to which they can communicate, and conversely, any machine holding a copy of a database, are expected to be willing to service read and write requests from other clients.

Nevertheless, in connection with a system which would find the present invention particularly useful, a client will tend to write to or read from primarily just one server when the system is functioning normally, and the client will switch over to another server, preferably nearby, when its primary server is for any reason unavailable. For example, client 16 may use server 10 as its primary server for reads 20, and writes 22. However, if server 10 is unavailable, client 16, would, preferably, use "close" server 12 for read 24 and writes 26.

Database replication is needed to enable users to access a common database. Unfortunately, many algorithms for managing replicated data, such as those based on maintaining strong data consistency by atomically updating all available copies, do not work well in a partitioned network such as is contemplated for the illustrated embodiment, particularly if site failures cannot be reliably detected. Moreover, algorithms based on pessimistic locking are also unattractive because they severely limit availability and perform poorly when message costs are high. A focus of the present invention therefore, is on unintentional network partitionings and overloads that could impede communication among servers and between clients and remote servers. In particular, the present invention is particularly useful with a multicast approach where each of the servers are usually within reach of each other.

To maximize a client's ability to read and write data, a read-any/write-any replication scheme, is preferred. This enables a user (i.e. client) 16, 18 to read from and write to any copy of the database. The timeliness with which writes will propagate to all other replicas of the database, as at 28 and 30, cannot be guaranteed because communication with certain of these replicas may be currently infeasible. Thus, the replicated databases are only weakly consistent. Techniques for managing weakly consistent replicated data, which have gained favor not only for their high availability but also for their scalability and simplicity, have been employed in a variety of prior systems.

Figure 2:
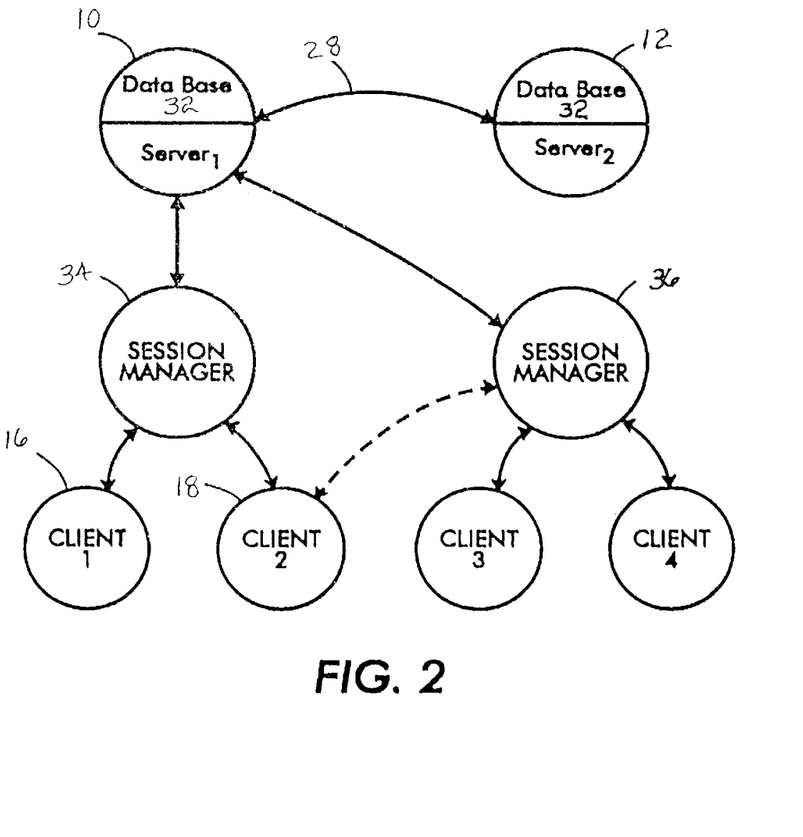
FIG. 2 is an exemplary configuration of clients, servers and session managers.

As shown in some additional detail in FIG. 2, servers, such as 10 and 12, propagate writes, as at 28, among copies of a typical database 32 using an epidemic-type protocol, known as anti-entropy protocol. Anti-entropy ensures that all copies of a database 32 are converging towards the same state and will eventually converge to identical states if there are no new updates. To achieve this, the servers 10 and 12, as well as all other servers, must not only receive all writes but must also order them consistently.

Peer-to-peer anti-entropy is employed to ensure that any two servers that are able to communicate will be able to propagate updates between themselves. Under this approach, even machines that never directly communicate can exchange updates via intermediaries. Each server periodically selects another server with which to perform a pair-wise exchange of writes, as at 28; with the server selected depending on its availability as well as on the expected costs and benefits. At the end of this process, both servers 10 and 12 have identical copies of the database 32, —viz., at the end of the process, the servers 10 and 12 have the same writes effectively performed in the same order. Anti-entropy can be structured as an incremental process so that even servers with very intermittent or asymmetrical connections can eventually bring their databases into a mutually consistent state.

A potential disadvantage of using read-any/write-any replication is that inconsistencies can appear within different instances of a given database 32, even when only a single user or application is making data modifications. For example, a mobile client might issue a write at one server, such as the server 12, and later issue a read at a different server 10. The client would see inconsistent results, unless these two servers 10 and 12 had performed anti-entropy, with one another or through a common chain of intermediaries, sometime between the execution of those two operations.

To alleviate these problems, session guarantees are provided by session managers 34,36. A "session" is an abstraction for the sequence of read and write operations performed on a database, such as the database 32, by one or more participants in the session during the execution of an application. Guarantees are provided by the session managers 34 or 36 on a per-session basis.

These guarantees can be invoked to give individual applications a view of the database 32 that is consistent with their own actions, even if these applications read and write from various, potentially inconsistent servers.

It is to be appreciated that the present invention improves short-term performance of any relatively slow replication scheme, weakly consistent or otherwise, and is not dependent of being used with any specific epidemic or rumor-managing algorithm. Rather these types of data replication are used for an understanding of an embodiment of the present invention only.

Epidemic Protocols

This section discusses a replicated database and presents the concepts of epidemic type systems, including anti-entropy and other complex epidemic protocols in greater detail.

Consider a network consisting of a set S of n sites, each storing a copy of a database. The database copy at site s δ S is a time-varying partial function $$s.\text{ValueOf}: K \rightarrow (v:V \times t:T) \tag{Eq. 1}$$

where K is a set of keys (names), V is a set of values, and T is a set of timestamps. V contains the distinguished element NIL but is otherwise unspecified. T is totally ordered by <. We interpret s.ValueOf[k]=(NIL,t) to mean that the item identified by k has been deleted from the database. That is, from a database client's perspective, s.ValueOf[k]=(NIL,t) is the same as "s.ValueOf[k] is undefined."

The exposition of distribution techniques are simplified by considering a database that stores the value and timestamp for only a single name. This is done without loss of generality since the algorithms treat each name separately, So we will say $$s.\text{ValueOf} \in \rightarrow (v:V \times t:T) \tag{Eq. 2}$$

i.e., s.ValueOf is an ordered pair consisting of a value and a timestamp. As before, the first component may be NIL, meaning the item was deleted as of the time indicated by the second component.

The goal of the update distribution process is to drive the system towards $$\forall s, s' \in S : s.\text{ValueOf} = s'.\text{ValueOf} \tag{Eq. 3}$$

There is one operation that clients may invoke to update the database at any given site, s:

$$\text{Update}[v:V] \equiv s.\text{ValueOf} \leftarrow (v, \text{Now}[]) \tag{Eq. 4}$$

where Now is a function returning a globally unique timestamp. One hopes that the timestamps returned by Now[] will be approximately the current Greenwich Mean Time—if not, the algorithms work formally but not practically. For our purposes here, it is sufficient to know that a pair with a larger timestamp will always supersede one with a smaller timestamp. In its most basic form anti-entropy is expressed by the following algorithm periodically executed at each site s:

FOR SOME s'∈ S DO
ResolveDifference[s,s']
ENDLOOP

The procedure ResolveDifference[s,s'] is carried out by the two servers in cooperation. Depending on its design, its effect may be expressed in one of three ways, called push, pull and push-pull:

---

ResolveDifference: PROC[s,s'] = { --push
   IF s.ValueOf.t > s'.ValueOf.t THEN
     s'.ValueOf ← s.ValueOf
   }
ResolveDifference: PROC[s,s'] = {--pull
   IF s.ValueOf.t < s'.ValueOf.t THEN
     s.ValueOf ← s'.ValueOf
   }
ResolveDifference: PROC[s,s'] = {--push-pull
   SELECT TRUE FROM
     s.ValueOf.t > s'.ValueOf.t ⇒ s'.ValueOf ← s.ValueOf;
     s.ValueOf.t > s'.ValueOf.t ⇒ s.ValueOf ← s'.ValueOf;
     ENDCASE ⇒ NULL;
   }

---

For the moment it is assumed that site s' is chosen uniformly at random from the set S, and that each site executes the anti-entropy algorithm once per period.

It is a basic result of epidemic theory that simple epidemics, of which anti-entropy is one, eventually infect the entire population. The theory also shows that starting with a single infected site this is achieved in expected time proportional to the log of the population size. The constant of proportionality is sensitive to which ResolveDifference procedure is used. For push, the exact formula is $\log_2(n) + \ln(n) = O(1)$ for large n.

As expressed here the anti-entropy algorithm is expensive, since it involves a comparison of two complete copies of the database, one of which is sent over the network. Ideally, the copies of the database are in nearly complete agreement, so most of the work is wasted. Given this observation, a performance improvement is for each site to maintain a checksum or hashing of its database contents, recomputing the checksum or hashing incrementally as the database is updated. Sites performing anti-entropy first exchange checksums or hashes, comparing their full databases only if the checksums or hashings disagree.

Another type of epidemic algorithm other than anti-entropy is described as "rumor spreading" and is based on the following scenario: There are n individuals, initially inactive (susceptible). A rumor is planted with one person who becomes active (infective), phoning other people at random and sharing the rumor. Every person hearing the rumor also becomes active and likewise shares the rumor. When an active individual makes an unnecessary phone call (the recipient already knows the rumor), then with probability 1/k the active individual loses interest in sharing the rumor (the individual becomes removed). It is desirable to know how fast the system converges to an inactive state (a state in which no one is infective) and the percentage of people who know the rumor (are removed) when this state is reached.

Variations of rumor spreading includes Blind vs. Feedback, Counter vs. Coin, Push vs. Pull, Minimization, Connection Limit, and Hunting, which have been discussed in the existing literature.

The above-discussed epidemic-style communications thus, provide updates which are periodically sent by means of pair-wise interactions to neighboring replicas that haven't yet heard of the update. This approach ensures that all updates will reach all replicas, assuming that all replicas engage in sufficient pair-wise update exchanges so that a transitive closure on propagation is achieved. However, the drawback of such systems is that it may take a considerable amount of time for any given update to reach all replicas whose local clients may be interested in its value. This time delay exists for two reasons: (i) the exchange interaction is designed to be an infrequent "batch" operation that is not done every time a new update appears at a replica. Hence, updates may experience a delay before being forwarded onto neighboring replicas; (ii) the pair-wise nature of epidemic communications implies that replicas that are "far away" from each other will receive updates only after they have experienced several "exchange hops" through the system.

Further information on Epidemic protocols may be found in the article entitled, Epidemic Algorithms for Replicated Database Maintenance, Demers, et al., Association of Computing Machinery, January 1989. U.S. Pat. No. 5,577,240 to Demers, et al., entitled "Identification of Stable Writes in Weakly Consistent Replicated Databases While Providing Access to All Writes in Such a Database; and U.S. Pat. No. 5,581,754, to Terry et al., Consistent Replicated Databases, all hereby incorporated by reference.

Multicast Protocols

In some applications, there would be a benefit to speed up the propagation of updates in order to provide more timely data. One manner of providing lower latency updates is by providing data through a multicasting data updating system. A primary advantage of multicasting is that it places a relatively low load on the sender, intermediate networks and routers. The sender does not need to send a separate copy to each database which is to be updated, and the intermediate networks and routers see only a logarithmic fraction of the total load. This allows the system to send a large number of updates with relative frequency.

Multicasting is not connection-oriented. A multicast datagram is delivered to destination group members on a "best-effort" standard of reliability. This means that a multicast datagram is not guaranteed to reach all members of a group, neither are packets guaranteed to arrive in the order in which they were transmitted.

Figure 3:
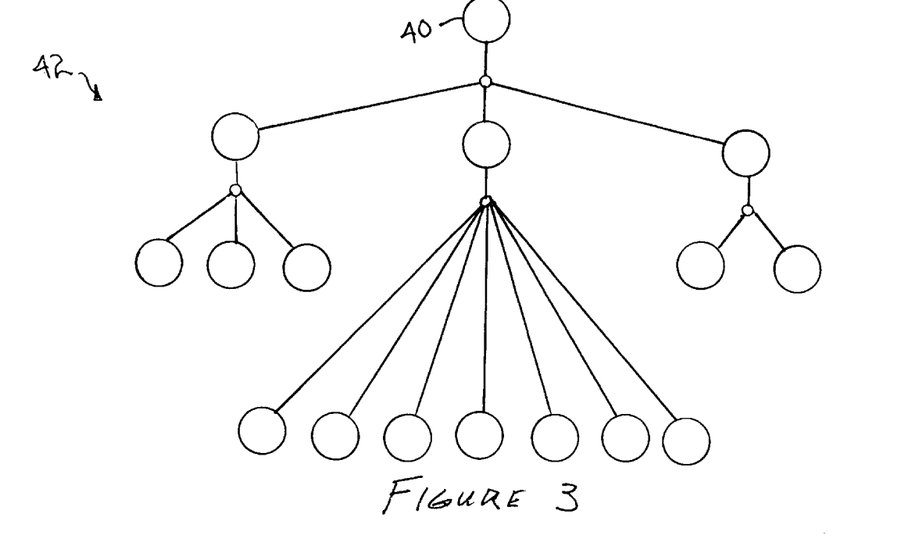
FIG. 3 is a diagram of a multicasting system.

As shown in the simplified depiction of FIG. 3, in a multicast transport service, a single node 40 of a multicast group 42 can send data to many destinations nodes 42 by making just a single call on the transport service. In a multicast system, hosts are free to join or leave a multicast group at any time. No restrictions exist on the physical location or the number of members in a multicast group. The host may be a member of more than one multicast group at any given time, and does not have to belong to a group to send packets to members of a group 42.

A group membership protocol is employed by routers to learn about the presence of group members on their directly attached sub-networks. When a host joins a multicast group, it transmits a group membership protocol message for the group (s) that it wishes to receive, and sets its IP process and network interface card to receive frames addressed to the multicast group. Multicast routers execute a multicast routing protocol to define delivery paths that enable the forwarding of multicast datagrams across a network. Multicast routing protocols establish or help establish the distribution tree for a given group, which enables multicast forwarding of packets addressed to the group.

A multicast address is assigned to a host comprising a multicast group. Senders use the multicast address as the destination address of a packet that is to be transmitted to all group members.

It is known that distributed systems have a variety of uses. With attention to the present invention, when an alteration to data in one of the databases of the system occurs, a multicasting replication function issues an update to all members of the group in an expeditious manner. However, as previously noted, since multicasting is a "best effort" communication medium, there are no guarantees that all updates will reach all replicas.

Specific multicast protocols which are used to provide the updates include various versions of the Internet Group Management Protocol (IGMP) which runs between hosts and their immediately-neighboring multicast routers. The mechanisms for the protocol allow a host to inform its local router that it wishes to receive transmissions addressed to a specific multicast group. Also, routers periodically query the LAN to determine if any group members are still active. If there is more than one IP multicast router in the LAN, one of the routers is elected "querier" and assumes the responsibility of querying the LAN for the presence of any group members.

Based on the group membership information learned from the IGMP, a router is able to determine which (if any) multicast traffic needs to be forwarded to each of its "leaf" sub-networks. "Leaf" sub-networks are those that have no further downstream routers. They either contain receivers for some set of groups or they do not. Multicast routers use the information derived from IGMP, along with a multicast routing protocol to support IP multicasting across the MBone. The internet multicast backbone (MBone) is an interconnected set of sub-networks and routers that support the delivery of IP multicast traffic.

IGMP provides a final step in a multicast packet delivery service since it is only concerned with the forwarding of multicast traffic from a router to group members on its directly attached sub-networks. IGMP is not concerned with the delivery of multicast packets between neighboring routers or across the internet network.

To provide an internet work delivery service, it is necessary to define multicast routing protocols. A multicast routing protocol is responsible for the construction of multicast delivery trees and enabling multicast packet forwarding. A number of different techniques are employed for multicast routing protocols. These may be classified as "simple minded" techniques (including flooding, multicast extensions to MAC-layer spanning trees), source-based tree (SBT) techniques (including reverse path broadcasting (RPB), truncated reverse path broadcasting (TRPB), reverse path multicasting (RPM)), and "shared-tree techniques."

These algorithms are implemented in prevalent multicast routing protocols such as the distance vector multicast routing protocol (DVMRP), protocol independent multicast-dense mode (PIM-DM), and core-based trees (CBT). The DVMRP, MOSPF, and PIM-DM protocols are known as "dense mode" routing protocols. These are designed to work well in environments that have plentiful bandwidth and where it is reasonable to assume that receivers are rather densely distributed. These protocols underlining designs assume that the amount of protocol overhead, (in terms of the amount of state that must be maintained by each router, the number of router CPU cycles required, and the amount of bandwidth consumed by protocol operation) is appropriate since receivers densely populate the area of operation.

Another group of multicast protocols are known as "sparse mode" routing protocols. Unlike the dense mode protocols, these are intended and designed to operate in an efficient manner over a wide area network where the bandwidth is limited and group members of the system may be sparsely distributed. It should be noted that by use of the term sparse, does not mean that these protocols are to be used for small groups. Rather, this concept is meant to express that the groups are widely dispersed and therefore it would be wasteful to, for instance, flood their data periodically across the entire inter-network.

Two particular sparse-mode routing protocols are the protocol independent multicast-sparse mode (PIM-SM), and the core-based trees (CBT) protocol.

PIM-SM and CBT have been designed to provide highly efficient communication between members of sparsely distributed groups, which are likely to be prevalent in wide-area internet networks.

The standard multicast model for IP networks includes:
IP-style semantics: a source can send UDP/IP packets at any time without a need to register or schedule transmission. Because packets are UDP, they are delivered using best effort.

Open groups: senders only need to know a multicast address. They do not need to know group membership and they do not need to be a member of the multicast group they are sending to. A group can have any number of sources.

Dynamic Groups: Multicast group members can join or leave a multicast group without the need to register, synchronize or negotiate with any centralized group management entity. Some sparse-mode protocols are described below.

MOSPF: Multicast Extensions to OSPF (MOSPF) uses the particular mechanisms of the Open Shortest Path First (OSPF) protocol to provide multicast. Basically, MOSPF routers flood information about group receivers throughout an OSPF area. This allows all MOSPF routers in an area to have the same view of group membership. In the same way that each OSPF router independently constructs the unicast routing topology, each MOSPF router can construct the shortest path tree for each multicast group. While group membership reports are flooded throughout the OSPF area, data is not. This characteristic combined with the explicit join mechanism makes MOSPF a sparse mode protocol.

PIM-SM: Protocol Independent Multicast (PIM) has been split into two protocols, the dense mode version called (PIM-DM) and a sparse mode version called (PIM-SM). There are actually two versions of PIM-SM.

For clarity, it is worth summarizing some multicast terminology. Multicast protocols use either a "broadcast-and-prune" or an "explicit join" mechanism. Broadcast-and-prune protocols are also called "dense mode protocols" and use a "shortest path tree" rooted at a source. This class of protocols assumes hosts are receivers more often than not and require routers to explicitly prune unwanted traffic. Explicit join protocols also called "sparse mode protocols" can use either a shortest path tree or a "shared tree". A sparse mode protocol assumes receivers do not necessarily want multicast traffic and so require explicit joins. A shared tree uses a "core" or a "rendezvous point" to bring sources and receivers together. Another sparse-mode protocol is called Core Based Trees (CBT).

Additional information of Multicast communication may be found in the article by Levine et al., entitled, Organizing Multicast Receivers Deterministically by Packet-Loss Correlation, ACM Multimedia '98, Bristol, UK, 1998; and Requests for Comments RFC 1112, RFC 1075 and RFC 2236 (which all may be found at http://www.cis.ohio-state.edu/htbin/rfc/rfc-index.html), all hereby incorporated by reference.

Epidemic/Multicast System Configurations

Figure 4:
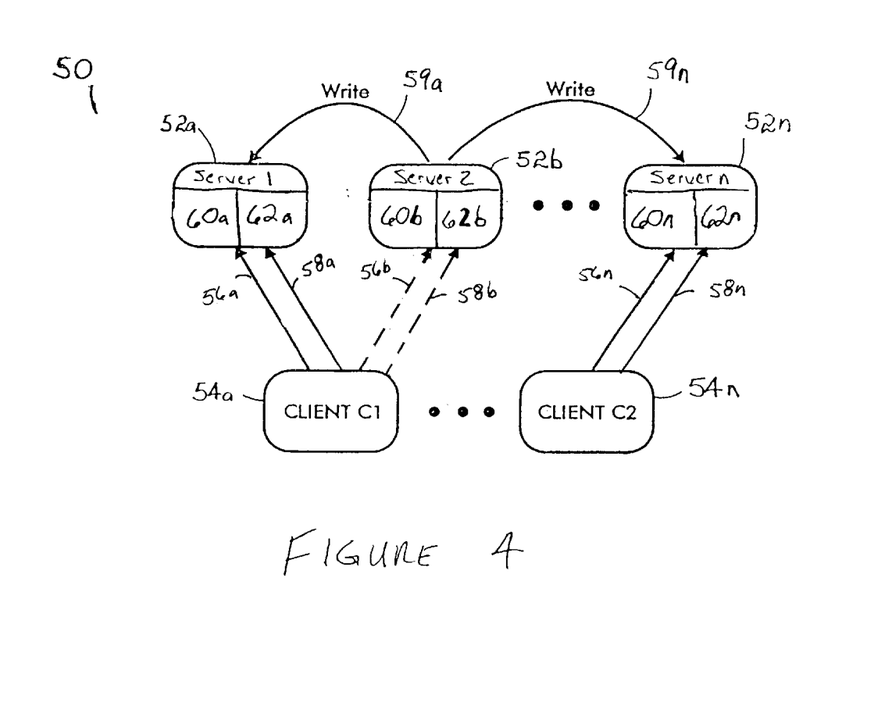
FIG. 4 is a configuration of a system operating in accordance with an embodiment of the present invention.

With more particular attention to the present invention, as shown in FIG. 4, in a communication system 50 having a number of databases (servers) 52a–52n, and clients 54a–54n with multiple read 56a–56n and write 58a–58n, 59a–59n operations being executed, the present invention provides servers 52a–52n with a version of epidemic update communications facilities 60a–60n as well as multicast update communications facilities 62a–62n for the replication of data upon the receipt of updated information at one of the servers 52a–52n. The present invention employs a variation of multicast communication update facilities 60a–60n as a means of quickly propagating update information, in weakly-consistent replicated data storage systems, while relying on epidemic update communications facilities 60a–60n to ensure that updates eventually propagate to all replicas, despite system component failures and network partitioning events. Stated in another way, the epidemic-style communications handle a wide variety of failures at multiple levels of the system using a single, very robust but also relatively high latency, mechanism. Multicast communications offers much quicker propagation but less fault tolerance. For weakly consistent, replicated systems, improvement in system operation is obtained by providing servers with both capabilities, where each operates in parallel with the other. Such a designed network offers the best of both individual approaches.

In environments where unreliable multicast can be expected to be "almost always reliable", an approach as shown in FIG. 4 of providing epidemic update communications facilities, 60a–60n in conjunction with multicast update communication facilities 62a–62n with each server so that they run in an independent manner is sufficient to support applications that need the appearance of quickly propagating strongly consistent data in the common case, but are designed to tolerate delays and weakly consistent data during exceptional circumstances. One example of an application and a domain that fits this description is maintaining system status information for the hosts in a local area network that is not grossly overloaded. Thus, the combination of the epidemic-style communications and multicast communications operating within the system but independent of each other's operational parameters describes one embodiment of the present invention.

In another embodiment of a present invention, the foregoing design may be extended to less reliable multicast environments by employing more complicated forms of multicast. For example, a scalable, reliable multicast (SRM) system may be used as the multicast protocol of FIG. 4, to speed the propagation of updates while still relying on the underlying epidemic-style propagation scheme to ensure that presently disconnected or crashed replicas eventually receive all updates. Replicas in this discussion are servers where any update of data is to be made.

While it may be possible that employing only SRM to propagate updates, even to currently disconnected replicas, would result in consistent systems, this would not fulfill the design requirements of weakly-consistent, replicated systems. In particular, in order to allow timely completion of individual multicasting, SRM must eventually drop unresponsive receivers from a receiver set even if they haven't received an update, implying that some updates may never reach some replicas.

Figure 5:
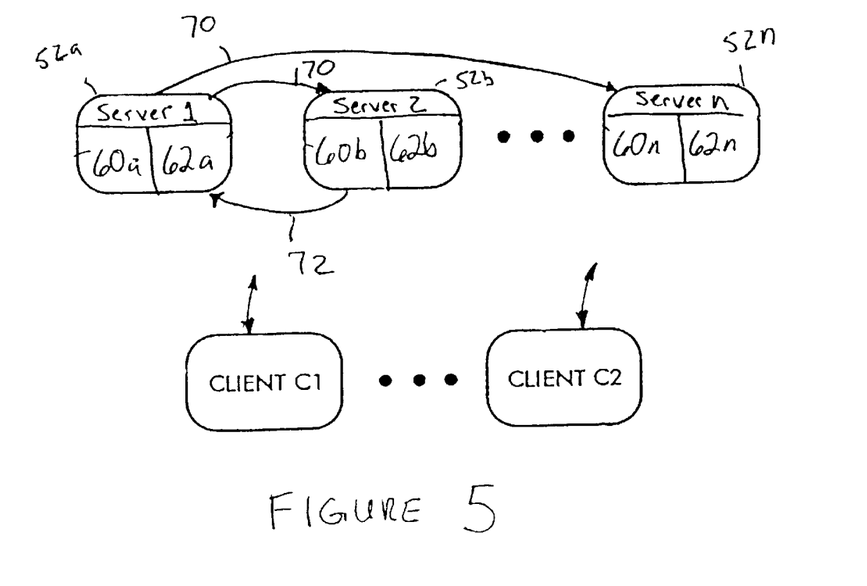
FIG. 5 is another embodiment of the present invention.

As illustrated in FIG. 5, a further embodiment of the present invention extends the present design to employ unreliable multicast as a way of influencing the rates at which the epidemic-style communications take place. For example, if updates are large and of interest only to the clients attached to a subset of all replicas (i.e. servers) in the system, then replicas will send out update summary information 70. Replicas that are interested in announced updates then engage in appropriate reply communication 72 to obtain the actual updates by means of epidemic-style communications. Provision of the updates may be provided by known communication techniques, and standard techniques to counter multicast reply implosion would be used to ensure that interested replicas did not all try to obtain a newly announced update at exactly the same time.

Figure 6:
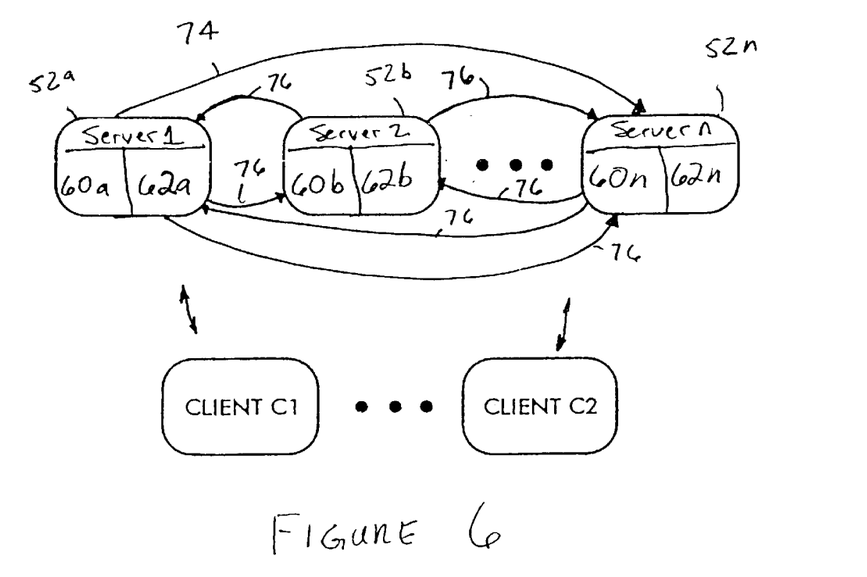
FIG. 6 shows a further embodiment of the present invention.

Another embodiment as shown in FIG. 6, is to continue to perform multicast updates 74, while in addition replicas also send out periodic "heartbeat" messages 76. This allows any replica in the system to detect when it has missed a multicast update for some reason and to adjust its epidemic-style communication parameters accordingly. Particularly, in one embodiment, the replica (e.g. server 52b) would reduce the time interval before initiating pair-wise communication with the replica (e.g. 52a) from which the missed update originated.

Figure 7:
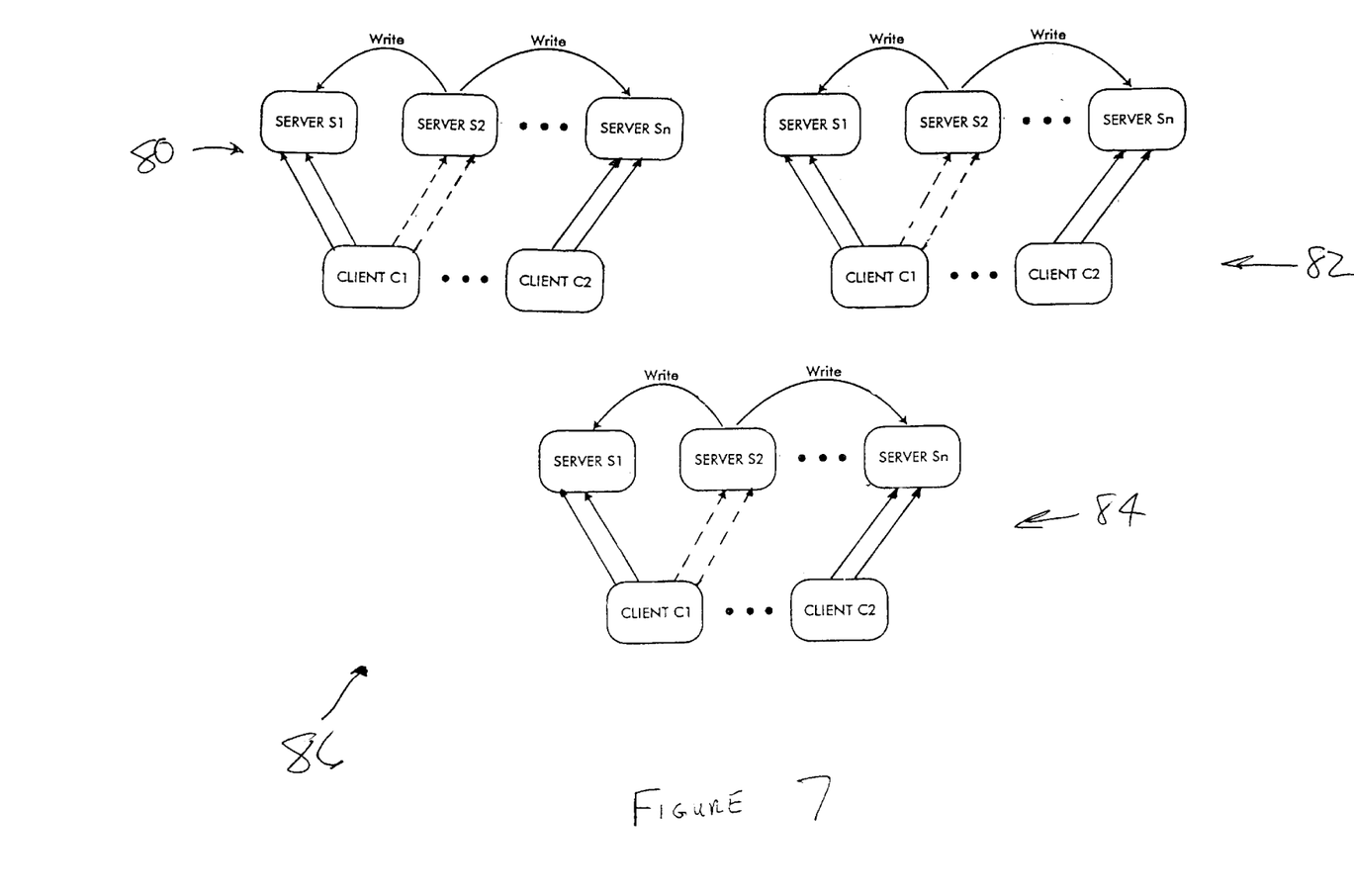
FIG. 7 shows yet another embodiment of the present invention.

Yet another embodiment of the present invention is shown in FIG. 7, and employs multiple multicast groups (80, 82, 84) in order to target the propagation and/or announcement of updates to subsets of replicas of an overall system 86. This is advantageous in systems where there are many replicas with a large amount of update traffic and where any given update is of interest only to clients of some subsets of all storage replicas.

From the foregoing, it is to be understood that multicast transmissions form an intermediate part of each client update initiated at any server, and thus usually propagate updates to all replicas in close to real time, whereas epidemic or anti-entropy approaches are normally run at much less frequent intervals. It is to be also appreciated that there are particular applications that receive value from both aspects, i.e. obtaining very up-to-date but possibly incomplete real-time information, with the eventual guarantee of receiving all data.

The foregoing is considered as illustrative only of the principals of the invention. Further, since numerous modifications and changes will readily occur to those skilled in the art, it is not desired to limit the invention to the exact construction and operation shown and described, and accordingly all suitable modifications and equivalents may be resorted to falling within the scope of the invention.

Having thus described the invention, it is now claimed:

1. In a multi-node computer network having a weakly consistent replicated data storage system, an enhanced update mechanism to enable continued operation of network subsets in the face of faults and network partitioning events, the enhanced update mechanism comprising:
   a multicast communication update facility configured to propagate updates from an originating replica source in the computer network to all replicas of the computer network at a single time using a best efforts design; and
   a pair-wise update communications facility which sends updates by pair-wise interaction to non-updated neighboring replicas, wherein the pair-wise update communications facility and the multicast communication update facility are employed together in at least some of the replicas.

2. The invention according to claim 1 wherein the pair-wise update communications facility is configured to send updates periodically in a batch arrangement.

3. The invention according to claim 1 wherein the multicast communication update facility and the pair-wise update communication facility are configured in accordance with parameters which allow for the facilities to operate in a parallel, non-overlapping manner with respect to each other.

4. The invention according to claim 1 wherein the multicast update communications facility is a scalable, reliable multicast communications protocol.

5. The invention according to claim 1 wherein the multicast update communications facility and the pair-wise update communications facility are configured in accordance with parameters which causes the multicast update communications facility to influence a rate at which the pair-wise update communications facility operates.

6. The invention according to claim 1 wherein the replicas are configured to send out update summary information, and the replicas interested in the summary update information are designed to engage in a reply communication to the replica sending the summary information.

7. The invention according to claim 1 wherein the multicast update communications facility is designed to issue a heartbeat-style message which allows a replica of the replicas in the system to detect when the replica has missed an update.

8. The invention according to claim 7 wherein upon the detection that the replica has missed an update, the replica is further designed to adjust its pair-wise communications parameters.

9. The invention according to claim 8 wherein adjusting of its pair-wise communication parameters includes, a reduction in a time interval for initiation of pair-wise communications with another replica.

10. The invention according to claim 1 further including multiple multicast groups employed to target propagation of updates or to announce updates to subsets of the replicas of the computer network, wherein the computer network includes a large number of replicas with a large amount of update traffic and any given update is of interest to only some subsets of all replicas.

11. The invention of claim 1 wherein the pair-wise communications update facility is an epidemic-style update facility.

12. The invention according to claim 11 wherein the epidemic style update facility is an epidemic protocol.

13. A method of enabling continued operation of network subsets in the face of faults and network partitioning events, in a multi-node computer network having a weakly consistent replicated data storage system, the method comprising:
   propagating updates, from an originating replica source of the computer network to all replicas of the computer network via a multicast communication update facility, at a single time using a best efforts design; and
   sending updates, by pair-wise interaction to non-updated neighboring replicas of the computer network via a pair-wise update communications facility, wherein the pair-wise update communications facility and the multicast communication update facility are employed together in at least some of the replicas.

14. The method according to claim 13 further including operating the multicast communication update facility and the pair-wise update communication in accordance with parameters which allow for the facilities to operate in a parallel, non-overlapping manner with respect to each other.

15. The method according to claim 13 further including configuring the multicast update communications facility and the pair-wise update communications facility in accordance with parameters which causes the multicast update communications facility to influence a rate at which the pair-wise update communications facility operates.

16. The invention according to claim 13 wherein the replicas are configured to send out update summary information, and the replicas interested in the summary update information are designed to engage in a reply communication to the replica sending the summary information.

17. The invention according to claim 13 wherein the multicast update communications facility is designed to issue a heartbeat-style message which allows a replica of the replicas in the system to detect when the replica has missed an update.

18. The method according to claim 17 wherein upon the detection that the replica has missed an update, the replica is further designed to adjust its pair-wise communications parameters.

19. The method according to claim 17 wherein adjusting of its pair-wise communication parameters includes, a reduction in a time interval for initiation of pair-wise communications with another replica.

20. The method according to claim 13 further including multiple multicast groups employed to target propagation of updates or to announce updates to subsets of the replicas of the computer network, wherein the computer network includes a large number of replicas with a large amount of update traffic and any given update is of interest to only some subsets of all replicas.

* * * * *